United States Patent
Holliman et al.

(10) Patent No.: US 9,532,576 B2
(45) Date of Patent: Jan. 3, 2017

(54) SYSTEMS AND METHODS FOR THE ELECTRIC FIELD CONTROLLED ANESTHETIZING OF FISH

(71) Applicant: SMITH-ROOT, INC., Vancouver, WA (US)

(72) Inventors: Michael F Holliman, Vancouver, WA (US); Lee Roy Carstensen, Vancouver, WA (US)

(73) Assignee: SMITH-ROOT, INC., Vancouver, WA (US)

( * ) Notice: Subject to any disclaimer, the term of this patent is extended or adjusted under 35 U.S.C. 154(b) by 0 days.

(21) Appl. No.: 14/967,152

(22) Filed: Dec. 11, 2015

(65) Prior Publication Data
US 2016/0095325 A1    Apr. 7, 2016

Related U.S. Application Data

(62) Division of application No. 12/266,219, filed on Nov. 6, 2008, now Pat. No. 9,210,942.

(51) Int. Cl.
*A22B 3/06* (2006.01)
*A01K 29/00* (2006.01)
*A01K 61/00* (2006.01)

(52) U.S. Cl.
CPC .............. *A22B 3/06* (2013.01); *A01K 29/005* (2013.01); *A01K 61/00* (2013.01)

(58) Field of Classification Search
CPC .............. A22B 3/06; A22B 3/08; A22B 3/083; A01K 29/005; A01K 61/00

USPC ......................................................... 119/220
See application file for complete search history.

(56) References Cited

U.S. PATENT DOCUMENTS

| | | | | |
|---|---|---|---|---|
| 3,110,978 A | * | 11/1963 | Kreutzer | A01K 79/02 43/4.5 |
| 3,797,459 A | * | 3/1974 | Harris | A01K 63/006 119/245 |
| 4,417,301 A | * | 11/1983 | Newman | A01K 79/02 307/106 |
| 4,672,967 A | * | 6/1987 | Smith | A61M 37/0069 119/215 |
| 4,713,315 A | * | 12/1987 | Smith | G03F 7/00 119/215 |
| 4,750,451 A | * | 6/1988 | Smith | A01K 79/02 119/220 |
| 5,111,379 A | * | 5/1992 | Sharber | A01K 79/02 307/106 |
| 5,233,782 A | * | 8/1993 | Sharber | A01K 79/02 43/17.1 |
| 5,270,912 A | * | 12/1993 | Sharber | A01K 79/02 307/106 |
| 5,305,711 A | * | 4/1994 | Sharber | A01K 61/001 119/215 |

(Continued)

*Primary Examiner* — Joshua Huson
(74) *Attorney, Agent, or Firm* — J. Curtis Edmondson; Law Offices Of J. Curtis Edmondson

(57) ABSTRACT

A system and method to induce fish anesthetizing or narcosis is described that induces a potential field across the body of a laboratory fish having a pair of electrodes, the waveform generated by this potential field is approximately balanced to reduce the introduction of anions into the solution, and a camera is mounted to observe the activity of the fish, so that the potential difference may be adjusted based on the state of the fish.

11 Claims, 8 Drawing Sheets

(56) References Cited

U.S. PATENT DOCUMENTS

| | | | | |
|---|---|---|---|---|
| 5,311,694 A * | 5/1994 | Sharber | ................. | A01K 79/02 43/17.1 |
| 5,327,668 A * | 7/1994 | Sharber | ................. | A01K 79/02 43/17.1 |
| 5,327,854 A * | 7/1994 | Smith | ................. | A01K 79/02 119/220 |
| 5,341,764 A * | 8/1994 | Sharber | ................. | A01K 79/02 119/220 |
| 5,445,111 A * | 8/1995 | Smith | ................. | H04B 13/02 119/220 |
| 5,460,123 A * | 10/1995 | Kolz | ................. | A01M 29/24 119/220 |
| 5,551,377 A * | 9/1996 | Sharber | ................. | A01K 79/02 119/220 |
| 5,566,643 A * | 10/1996 | Charter | ................. | A01K 79/02 119/220 |
| 6,132,303 A * | 10/2000 | Buckhaven | ............ | A22B 3/083 452/1 |
| 6,837,182 B2 * | 1/2005 | Leblanc | ................. | A01K 79/02 119/220 |
| 6,978,734 B1 * | 12/2005 | Smith | ................. | A01K 79/02 119/220 |
| 2006/0018833 A1 * | 1/2006 | Murphy | ............ | G01N 33/5088 424/9.2 |

* cited by examiner

SYSTEMS AND METHODS FOR THE ELECTRIC FIELD CONTROLLED ANESTHETIZING OF FISH

RELATED APPLICATIONS

This application is a divisional of U.S. Utility application Ser. No. 12/266,219 filed Nov. 6, 2008 which in turn claims the benefit of U.S. Provisional Application No. 61/004,451, filed Nov. 26, 2007, the contents herein incorporated into this application by reference.

BACKGROUND

The present inventive subject matter relates to stunning and/or euthanization of laboratory fish using electric currents and the monitoring of the laboratory fish to prevent injury thereof.

The effect of electric currents on fish are well known in the prior art and especially in the general techniques of electrofishing. Electrofishing involves the use of electric currents to attract and/or repel fish with the intent of creating aquatic barriers, sample fish barriers, and/or to increase collection yields.

It has been established that relatively small potentials that are impressed across the body of a fish invoke a flight reaction. Larger potentials result in electrotaxis. Still larger potentials may result in euthanasia of the fish.

Electrofishing has traditionally been used in freshwater lakes and streams and is the subject of U.S. Pat. Nos. 5,445,111; 5,327,854; 4,750,451; 4,672,967 4,713,315; 5,111,379; 5,233,782; 5,270,912; 5,305,711; 5,311,694; 5,327,668; 5,341,764; 5,551,377; and 6,978,734. Also, electrofishing has been the used to stimulate yields of fishing in conjunction with the use of trawl nets as described in U.S. Pat. Nos. 3,110,978 and 4,417,301. Systems for controlling electricity in aquatic environments has also been described in U.S. Pat. No. 5,460,123. Also there are systems for monitoring small laboratory fish using cameras are described in U.S. Patent Publication 2006/0018833. The content of all of these referenced applications are incorporated into this specification by reference.

Therefore in the prior art, a considerable body of work is associated with the electrification of large bodies of water to impress electric fields across larger fish, such as salmon or trout, as compared to smaller fish, that would be typically be used for the purpose of laboratory experimentation.

The use of small fish, in particular zebrafish, are popular as biological models for scientific studies. The studies involve placing fish in laboratory desktop tanks, then subjecting the fish to physical, chemical, or biological stress. This is followed by an examination of the subject fish to determine the various effects on the fish as a result of the stresses. For the purpose of this application the term "fish" will refer to any suitable aquatic laboratory fish, including, but not limited to zebrafish.

A recurring problem with the examination of laboratory fish is that they tend to be very active. Also laboratory fish are dimensionally very small. The small size of the fish combined with their activity can impair the researcher from making precise scientific measurements unless the fish is caught and inspected.

Therefore there is a need for the laboratory researcher to euthanize laboratory fish in a relatively quick and painless manner. Ideally the state of euthanasia can be controlled for a period of time in which the measurement of the fish is needed. To induce euthanasia an electric field is applied to the water in the tank. This, in turn, induces an electric field across the body of the fish. This amount of electricity that is passed through the fish varies based on the orientation of the fish and the magnitude of the electric field.

Low electric fields evoke a deterrent response in the fish causing the fish to be repelled from the electric field. Greater electric fields may evoke an involuntary response that results in the fish being attracted and swimming towards the anode and away from the cathode. Still larger electric fields may result in a state of narcosis being induced in the fish. Higher electric fields may result in euthanasia (i.e. death) of the fish.

Prior art solutions and techniques that induce euthanasia in fish involve the addition of chemicals to the tank. Chemicals used for euthanasia are expensive to acquire, pose a storage and maintenance problem, and are at risk of degradation. These chemicals, which are toxic to fish, may have the unfortunate consequence of skewing laboratory results during any post-euthanasia pathology. Furthermore, the researcher runs the risk of exposure to the chemicals that are used to euthanize the fish. Also, the use of chemicals to euthanize fish may be unnecessarily complex and expensive, which would result in the added cost of training specialized personnel.

Furthermore, there is also a view that the chemical euthanasia of fish may induce unnecessary pain. In response, the American Veterinary Medical Association (AVMA) Panel on Euthanasia has lets lists three acceptable methods of euthanasia for fish, and two conditionally acceptable methods. These methods include the use as acceptable of such chemicals as tricaine methanesulfonate (MS-222), benzocaine (related to MS-222 but less soluble in water) and barbiturates.

In view of the high cost and risk of certain chemical agents that induce euthanasia in fish, there is a need to have a unit that will induce unconsciousness and euthanasia in laboratory fish without chemicals. There is also a need for a portable unit that can euthanize fish without the use of chemical agents. There is also a need for a unit that will shield the researcher from contact with potentially hazardous chemical agents. There is also a need for unit that can euthanize fish using electrical currents. There is also a need for a unit that can euthanize fish using rechargeable batteries.

There is also a need to have a monitoring system to insure that a laboratory fish does not come into contact with an anode or a cathode to reduce the risk of injurious shock to the fish.

There is also a need to reduce the leaching of anions into the solution (e.g. fish water) during fish euthanasia. In certain cases, a laboratory fish may be euthanized first by transferring to a euthanasia tank, then followed by actual euthanasia, then followed by disposal. During operation, anions will leach from the electrodes via electrolytic action resulting in the further contamination of the water. It is therefore desirable to have a unit that minimizes the leaching of anions from an electrode during euthanasia.

Therefore, what is desired is an apparatus to immobilize fish and place the fish in the state of euthanasia. It is also desired that this apparatus operate at relatively low voltage levels. It is also desired is an apparatus that is portable. It is also desired that the apparatus prevent the leaching of anions from electrodes into the water electrodes during operation.

SUMMARY

Described herein is a method for inducing an electrical potential across a laboratory fish, the method involving a programmable power supply, where the power supply has an anode and a cathode to the programmable power supply, inserting the anode and the cathode into a fish tank, increasing the potential difference between the anode and the cathode so that there is a potential difference of up to 10 V/cm across the body of the fish, decreasing the potential difference between the anode and the cathode to approximately 0 V/cm across the body of the fish; so that when the potential difference first increases and then decreases across the body of the fish, the fish experiences a physiological change. Also, this method also includes inducing a potential difference between the anode and cathode such that an electric field is increased and decreased across the fish in a cyclic manner.

The portable fish anesthetizing system also has a tank cover further control system further comprises a camera, where the camera is connected to the control system, a series of fish images are recorded from fish in the tank, the control system then identifies a class of fish, and in response to the class of fish detected, adjusts the current flow; so that the fish experiences electronarcosis, electrotaxis, and/or euthanasia. The portable fish anesthetizing camera system also is integrated with the tank cover.

These and other embodiments are described in more detail in the following detailed descriptions and the figures The foregoing is not intended to be an exhaustive list of embodiments and features of the present inventive subject matter. Persons skilled in the art are capable of appreciating other embodiments and features from the following detailed description in conjunction with the drawings.

DETAILED DESCRIPTION

Figure 1:
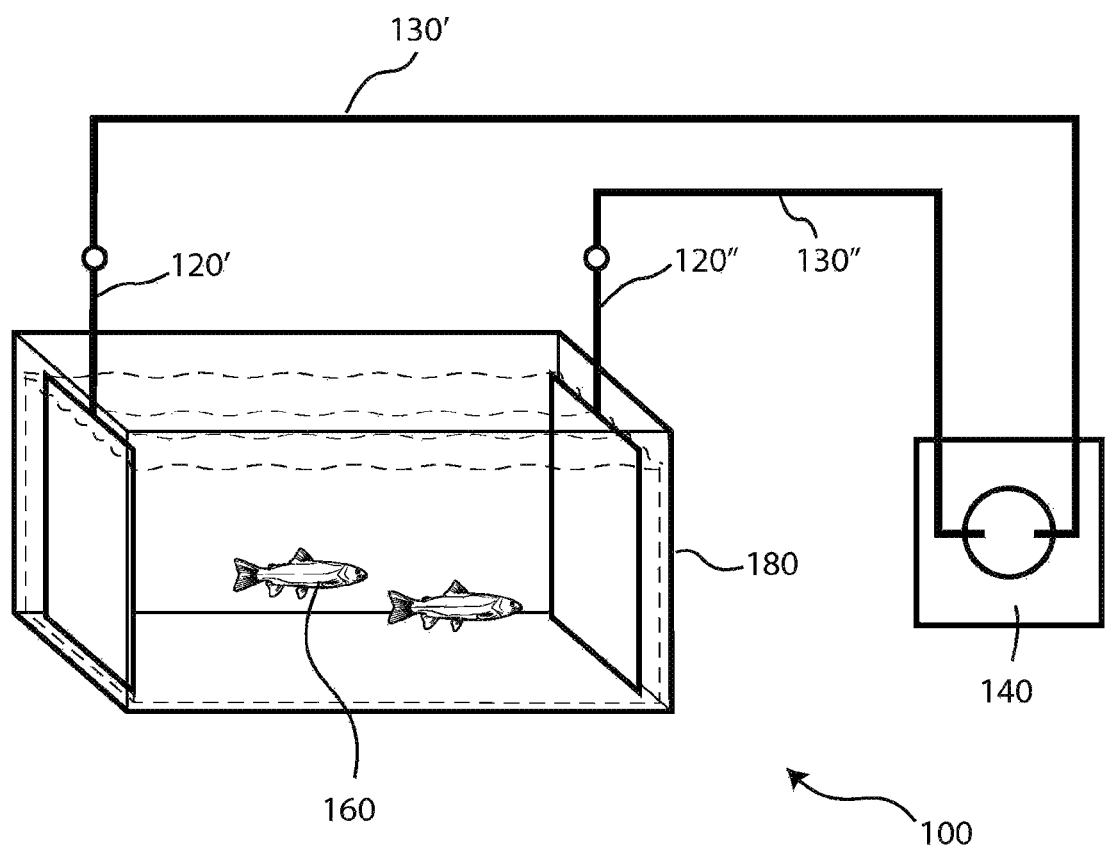
FIG. 1 is a system diagram of the laboratory fish anesthetizing system.

Representative embodiments according to the inventive subject matter are shown in FIGS. 1-8, wherein similar features share common reference numerals.

The term "fish" refers to experimental fish used in a laboratory setting, which include, but are not limited to zebrafish. These fish typically belong to, but are not limited to, the taxa group Telostei or Teleostomi. The teleost fish include such fish as zebrafish (*Danio rerio*), medaka (*Oryzias*, sp.), fathead minnow (*Pinephales promelas*), or goldfish (*Carassius auratus*). It is well established that fish have a typical response to electrical fields applied in the water, although each individual fish and each type of species may have a varying response.

The term "tank" is generally known to those in the arts as a water tank, the preferred embodiment being a 10-40 gallon tank used by researchers that customarily sets on a laboratory top. Tank can also include larger tanks including outdoor tanks and naturally occurring ponds and streams. Also, the characteristics of the water should not be limited to freshwater, but, may also include water of differing salinities including sea water.

The term "electrical stimulation" refers to an electrical field impressed on the tissue of a fish in water. This electrical field will have a range in values that is dependent on the age and species of the fish.

The term "programmable voltage supply" shall mean a device that can output a range of voltages and currents in a waveform that is programmed either by hardwire switch (e.g., a pulse generator) or by software (e.g. a computer controlled voltage generator).

Now referring to FIG. 1, a system 100 is shown for the anesthetizing fish. The system 100 has a water tank 110, two electrodes 120', 120" immersed in the water tank 110, two wires 130', 130" connected to the programmable voltage source 140. The water in the water tank 110 is filled to the water level 180. The electrodes 120', 120" are typically immersed below the water level 180. When voltage is applied across the two electrodes 120', 120" a voltage gradient is impressed across the fish 160. Depending on the size of the voltage gradient induced in the fish will determine the effect on the fish.

To anesthetize the fish 160, (electronarcosis), a voltage gradient of 150-250 V/m (1.5 to 2.5 V/cm) should be induced across the fish 160. To induce paralysis in the fish (electrotaxis) a greater voltage gradient than needed for electronarcosis should be induced across the body of the fish. To euthanize the fish 160, a voltage gradient of 1.5 to 5.0 V/cm or greater should be induced across the body of the fish 160. The voltage gradients needed for electronarcosis, electrotaxis, and euthanasia vary from fish species to fish species, and of course, differ based on the individual physiology of each fish.

In the laboratory setting, the water tank 110 will usually have dimensions of 2 feet in width, 4 feet in length, and 2 feet in height, holding the total water volume of 8 cubic feet or approximately 60 gallons. Freshwater conductivity in a laboratory tank ranges from 100 to 5000 S.

As previously mentioned, a fish typically used in laboratory biological studies is the zebrafish. Mature zebrafish grow to a size of approximately 6.4 cm. Juvenile zebrafish, which are more commonly used in research, range in size from approximately 0.9 to 1.5 cm.

The voltage potential varies as a matter of time and may be positive or negative on either electrode. Alternating current may also be used so that there is an equal balance of energy of time between the electrodes.

Figure 2:
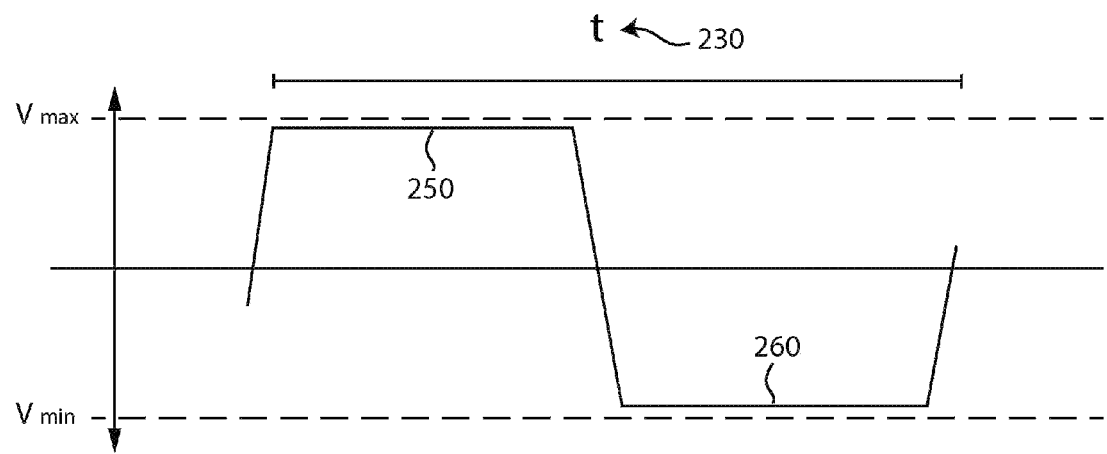
FIG. 2 is a waveform diagram of a single pulse with a continuous positive and negative opposite polarity lobes.

Now referring to an exemplary waveform as shown in FIG. 2. FIG. 2 shows an impulse waveform at the electrodes 120', 120" (as shown in FIG. 1) such that the impulse voltage Vmax 250 and the impulse voltage Vmin 260 are during the time period "t" 230. This impulse voltage Vmax 250 and impulse Vmin 260 should be of sufficient strength and duration to induce the physiological effects (e.g. electrotaxis and/or electronarcosis) on the laboratory fish.

Figure 3:
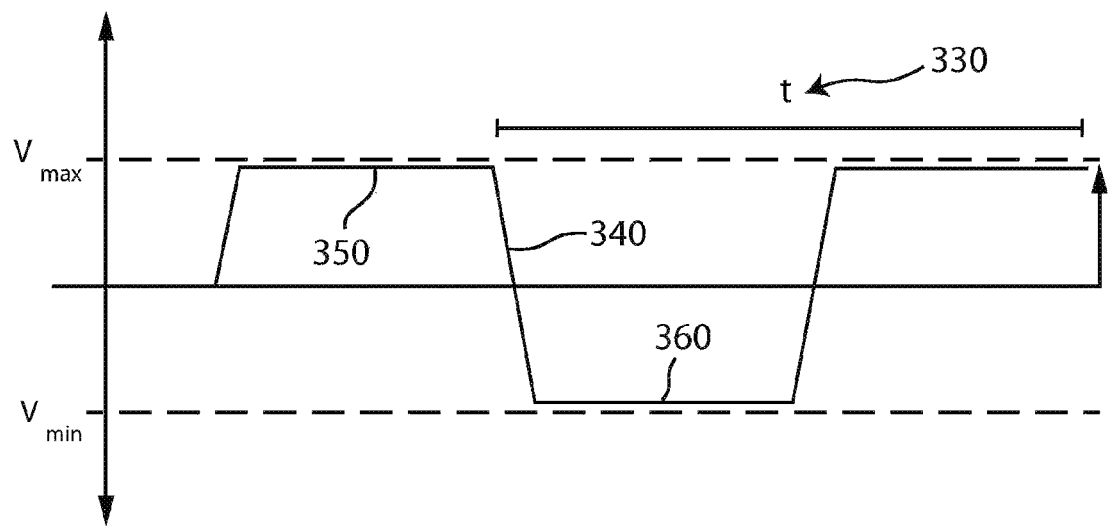
FIG. 3 is a waveform diagram of plural positive and negative lobes.

Another waveform as shown in FIG. 3, with a periodic electrical potential waveform between the electrodes 120', 120" (as shown in FIG. 1) such that the periodic voltage Vmax 350 and the periodic voltage Vmin 360 are during the period time "t" 330. The periodic voltage Vmax 350 and the period voltage Vmin 360 should be of sufficient strength and duration to induce the preferred physiological effect (e.g. electrotaxis, electronarcosis, or euthanasia) on the laboratory fish.

Figure 4:
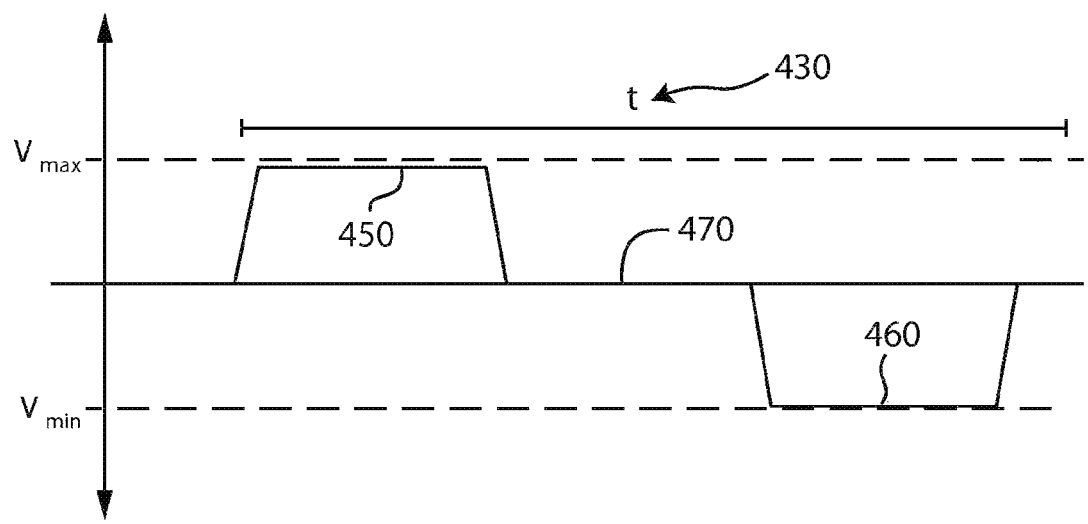
FIG. 4 is a modified waveform diagram with a zero-field dwell portion interposed between the positive and negative field lobes.

Another waveform as shown in FIG. 4 with a periodic waveform between the electrodes 120', 120" (as shown in FIG. 1) such that the dwell voltage Vmax 450 is separated by a dwell voltage Vdwell 470 and then followed by the periodic with dwell voltage Vmin 460 during the time period "t" 430. The periodic voltage with dwell should be of sufficient strength and duration to induce the physiological effects (e.g. electrotaxis and/or electronarcosis) on a laboratory fish.

Figure 5:
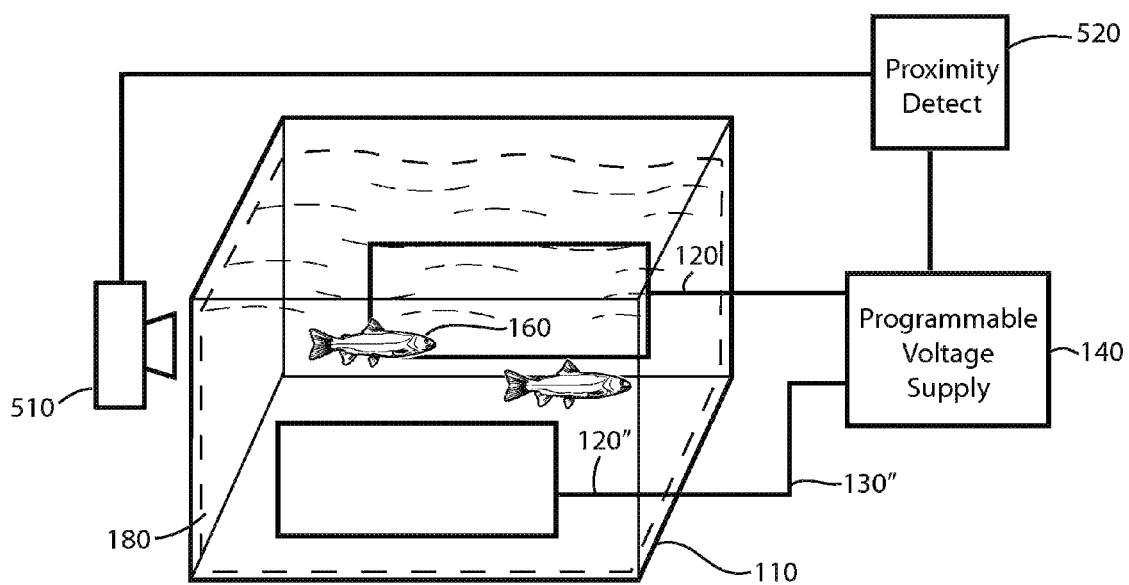
FIG. 5 is a system diagram of the laboratory fish anesthetizing system incorporating a proximity detector.

Now referring to the system as shown in FIG. 5, depicting a programmable voltage supply 140 connected to the electrodes 120', 120" that are immersed in the tank 110. The programmable voltage supply 140 is also connected to a proximity detector processor 520 and a proximity detector 510. The proximity detector 510 is used to determine if the fish 160 is close to the electrodes 120', 120". If the fish is in close proximity to the electrodes, then the output waveform (see FIGS. 2,3,4) is modified to prevent injury to the fish 160 either by diminishing or eliminating the range of voltage from the programmable voltage supply 140.

Figure 6:
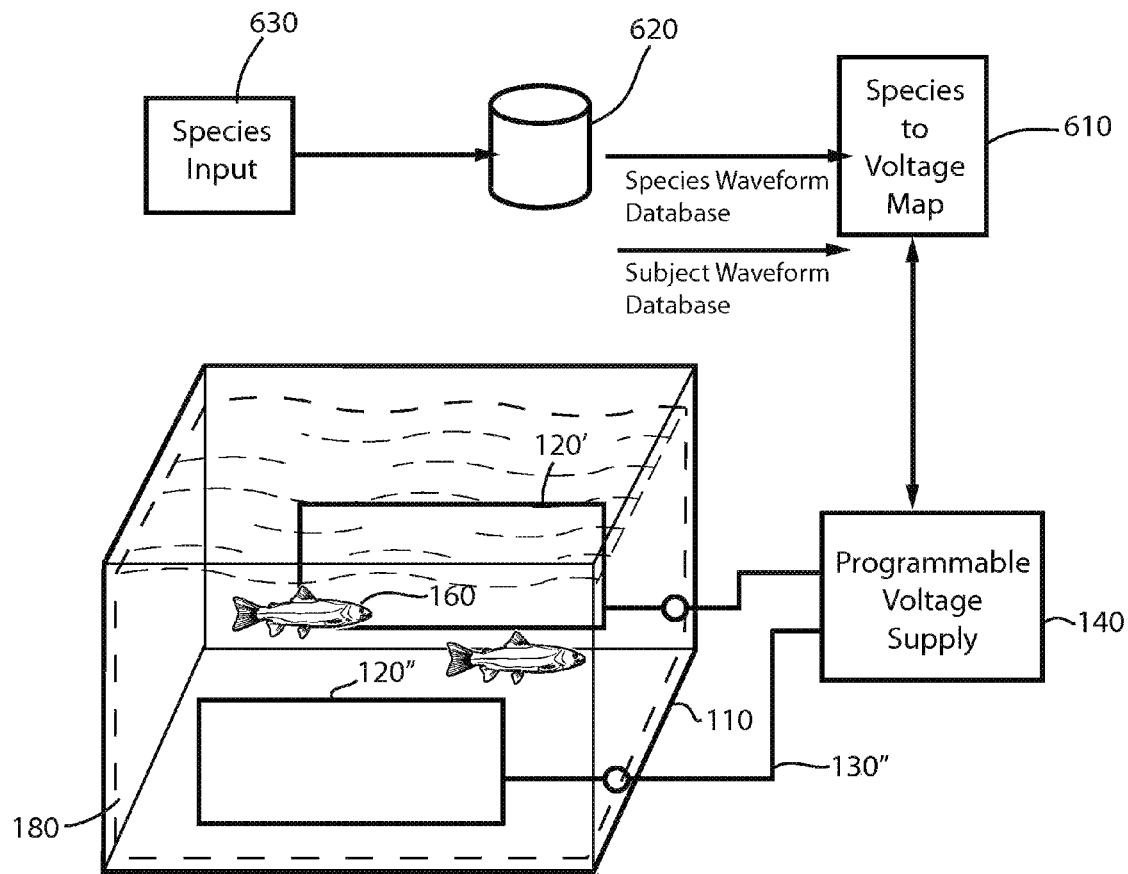
FIG. 6 is a system diagram of the laboratory fish anesthetizing system which incorporates a programmable database of voltage waveforms that are species and/or subject specific.

Now referring to the fish anesthetizing system which is shown in FIG. 6. FIG. 6 depicts a programmable power supply 140 connected to electrodes 120', 120" which create an electric field in the tank 110 and across the fish 160. Connected to the programmable voltage supply 140 is a species to voltage mapping device 610. The species to voltage mapping device 610 stores a database of species electrical waveforms in a database 620. This database is updated by the input device 630.

Figure 7:
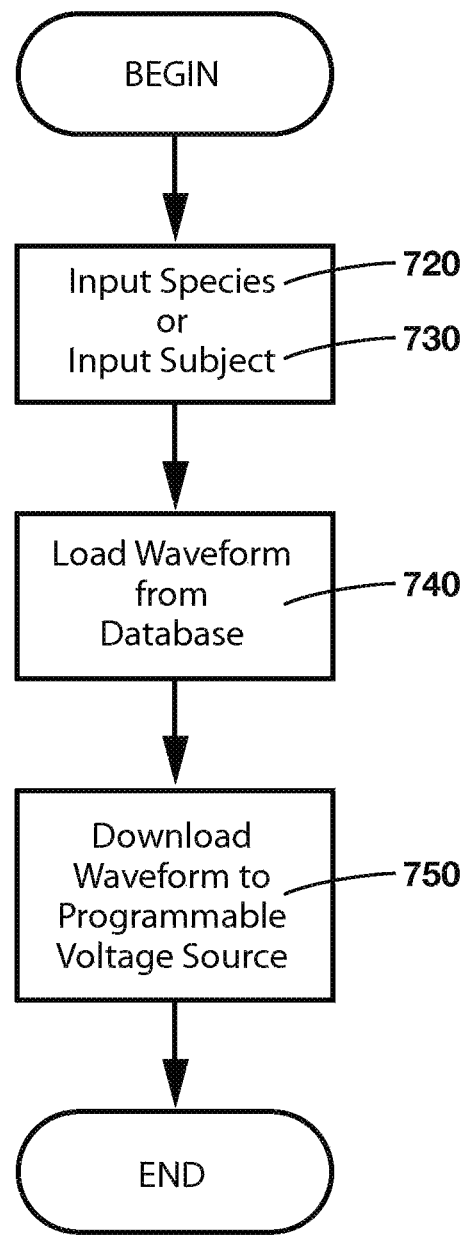
FIG. 7 is a flowchart of the laboratory fish anesthetizing system which incorporates a programmable database of voltage waveforms that are species and/or subject specific.

The operation of the fish anesthetizing system of FIG. 6 is shown in the flowchart of FIG. 7. A species 720 or subject 730 waveform is selected and is loaded from a database 740. This waveform will have a voltage range and characteristics induces either electrotaxsis or electronarcosis in the fish depending on the desired effect on the target species. Likewise the voltage range and characteristics depending on the subject profile, for example, if it is known that the target fish is a minnow that is 2 cm in length, this characteristic can be preselected from a database. Once the database voltage is selected it is transferred (i.e. downloaded) 750 from the species to voltage mapper to the programmable voltage source.

Figure 8:
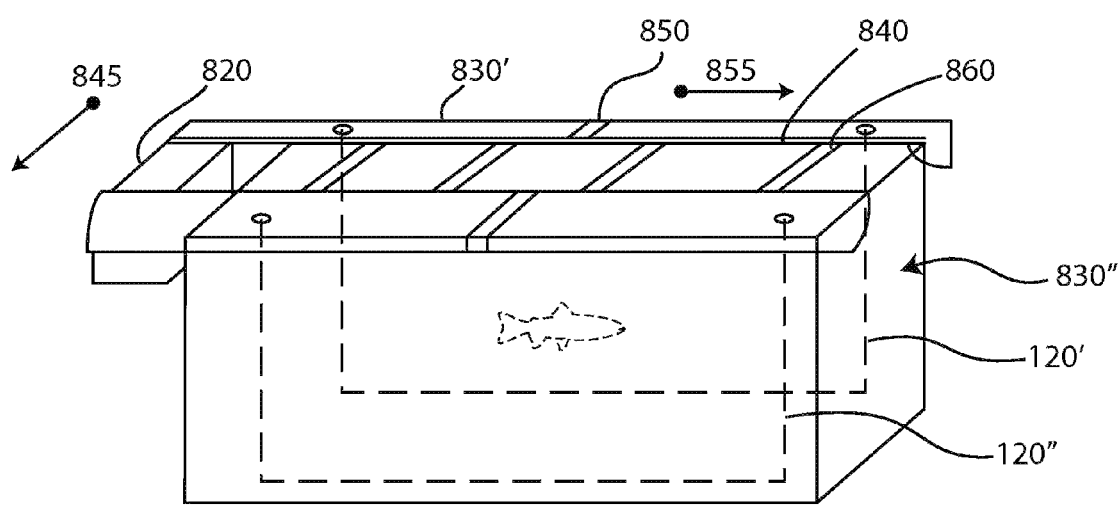
FIG. 8 is one physical configuration of the laboratory fish anesthetizing system.

Now referring to FIG. 8 that illustrates one configuration of the physical implementation of the laboratory fish anesthetizer 810. The system has a storage unit 820 that contains the electronics and associated power supply. The storage unit is connected to the electrode supports 830 which are integrated with the length supports 850. Interconnecting the two length supports are two width supports 840. The length support 850 can be expanded lengthwise 855 to accommodate tanks of varying lengths. The width support 840 can be expanded widthwise 845 so that tanks of varying widths can be accommodated. Optionally present is a top protector 860 so that access to the top of the laboratory water is blocked.

The system in FIG. 8 may be configured to prevent access to the water in the tank while the apparatus is operating. Those skilled in the arts will recognize that interlocking switches may be employed so that the electrodes 120', 120" of the laboratory fish anesthetizer 810 are not energized if power is applied Persons skilled in the art will recognize that there are a wide variety of databases that can used to store signal patterns, including, but not limited to SQL databases, text databases, or object oriented databases. Persons skilled in the art will recognize that there are a wide variety of programmable voltage supplies, including, but not limited to products manufactured by Lamda (Neptune, N.J., USA). It is also understood by those skilled in the art that the database and/or the programmable power supply may be implemented in firmware in a manner to reduce and/or minimize costs.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

The invention claimed is:

1. A method for inducing an electrical potential difference across a fish species, the method consisting of:
   creating a potential difference in a body of water across an anode and a cathode of a fish tank, said fish tank having the anode and the cathode spatially placed at the opposite ends of the fish tank;
   detecting the fish species in the body of water by a detector;
   mapping the detected fish species through a species to voltage mapping device, the species to voltage mapping device further comprising a database of a plurality of prestored species electrical waveforms; wherein selection of a prestored species electrical waveform from the database of a plurality of prestored species electrical waveforms is operably downloaded into the programmable power supply;
   varying the potential difference according to the selected prestored species electrical waveform so that the fish species experiences a physiological change.

2. The method of claim 1, wherein the physiological change experienced is electrotaxis.

3. The method of claim 1, wherein the physiological change experienced is electronarcosis.

4. The method of claim 1, wherein the physiological change experienced is electroeuthanasia.

5. The method of claim 1 wherein the maximum potential difference is greater than 5.0V across the body of fish.

6. The method of claim 1 wherein the species electrical waveform has a periodic waveform with a frequency from 0.1 to 1000 Hz.

7. The method of claim 1 where the species electrical waveform is an impulse.

8. The method of claim 1 where the species electrical waveform ranges from 1.5V/cm to 2.5V/cm across the body of each fish.

9. The method of claim 1 where the potential difference between the anode and the cathode is increased in a cyclic manner.

10. The method of claim 1 where the potential difference between the anode and the cathode is decreased in a cyclic manner.

11. The method of claim 1, further employing a top protector to prevent access to the fish tank when inducing the electrical potential difference across the fish species.

* * * * *